United States Patent
Bareket et al.

(10) Patent No.: US 12,393,520 B1
(45) Date of Patent: Aug. 19, 2025

(54) ADDRESS TRANSLATION SYSTEM, METHOD AND DEVICE

(71) Applicant: Marvell Asia Pte Ltd, Singapore (SG)

(72) Inventors: Yaron Bareket, Petach Tikva (IL); Adi Katz, Ramat Gan (IL); Ofer Lavi, Ramat Gan (IL)

(73) Assignee: MARVELL ASIA PTE, LTD, Singapore (SG)

( * ) Notice: Subject to any disclaimer, the term of this patent is extended or adjusted under 35 U.S.C. 154(b) by 0 days.

(21) Appl. No.: 18/607,489

(22) Filed: Mar. 17, 2024

Related U.S. Application Data

(60) Provisional application No. 63/454,372, filed on Mar. 24, 2023.

(51) Int. Cl.
  *G06F 12/10* (2016.01)
  *G06F 12/0831* (2016.01)
  *G06F 12/1009* (2016.01)
  *G06F 12/1045* (2016.01)

(52) U.S. Cl.
  CPC ...... *G06F 12/1063* (2013.01); *G06F 12/0833* (2013.01); *G06F 12/1009* (2013.01)

(58) Field of Classification Search
  CPC ............ G06F 12/1063; G06F 12/0833; G06F 12/1009
  See application file for complete search history.

(56) References Cited

U.S. PATENT DOCUMENTS

| | | | |
|---|---|---|---|
| 2007/0201490 A1* | 8/2007 | Mahamuni | H04L 45/24 370/395.54 |
| 2008/0251906 A1 | 10/2008 | Eaton | |
| 2018/0026940 A1* | 1/2018 | Sastri | H04L 63/08 711/202 |
| 2020/0310981 A1* | 10/2020 | Byun | G06F 12/1009 |
| 2020/0310982 A1* | 10/2020 | Byun | G06F 12/1009 |
| 2022/0418110 A1 | 12/2022 | Zhang | |

* cited by examiner

*Primary Examiner* — Tracy C Chan

(57) ABSTRACT

An address translation system, method and device including a translation extension unit associated with a client and having a client address translation cache storing a client cache of the address translations. When virtual address of a translation request from the client is the same as the virtual address of an address translation of the client cache, the translation extension unit returns the physical address that is mapped to the virtual address according to the address translation to the client without transmitting the translation request to a memory management unit that maintains a page table of all the translations and a translation lookaside buffer with a subset of the translations.

31 Claims, 3 Drawing Sheets

ADDRESS TRANSLATION SYSTEM, METHOD AND DEVICE

RELATED APPLICATIONS

This application claims priority under 35 U.S.C. § 119(e) of the U.S. provisional patent application Ser. No. 63/454,372 filed Mar. 24, 2023, and titled "OFFLOAD CONTEXT BASE ADDRESS TRANSLATION," which is hereby incorporated by reference.

FIELD OF INVENTION

The present invention relates to circuits implementing virtual address to physical address translations. More particularly, the present invention relates to address translation extension units for improving the translation rate of the circuits and/or systems.

BACKGROUND OF THE INVENTION

Input/output clients of processing systems (e.g. computing circuits) need to convert their virtual addresses to physical addresses in order to access the data stored on physical memory at the physical addresses within the processing system. This translation is made by submitting translation requests to and receiving translations from a memory management unit or system memory management unit (MMU). However, because data rate and thus translation request rate is high and MMU caches (e.g. translation lookaside buffers (TLBs)) cannot feasibly sustain large enough quantities of cached address translations, many translation requests result in MMU cache misses that then require the MMU to manually walk the translation page table (table walk) in dynamic random access memory (DRAM) thereby slowing the rate at which requested translations are produced.

BRIEF SUMMARY OF THE INVENTION

An address translation system, method and device including a translation extension unit associated with a client and having a client address translation cache storing a cached group of the address translations. When virtual address of a translation request from the client is the same as the virtual address of an address translation of the cached group, the translation extension unit returns the physical address that is mapped to the virtual address according to the address translation to the client without transmitting the translation request to a memory management unit that maintains a page table of all the translations and a translation lookaside buffer with a subset of the translations.

A first aspect is directed to an address translation system. The system comprises a non-transitory computer-readable main memory storing system data at a plurality of physical addresses and a page table including a plurality of address translations that map a plurality of virtual addresses to the plurality of physical addresses, a central processing unit coupled with the main memory and including a memory management unit and a translation lookaside buffer storing a subset of the address translations of the page table, a client configured to generate a translation request, wherein the client is allocated one or more allocated virtual addresses of the plurality of virtual addresses, the translation request including a target virtual address of the allocated virtual addresses, and the client associates the target virtual address with target data of the system data and a translation extension unit dedicated to the client and having a client address translation cache storing a cached group of the address translations, wherein each address translation of the cached group includes one of the allocated virtual addresses and one of the physical addresses that is mapped to the one of the allocated virtual addresses; wherein when the target virtual address of the translation request is the same as the allocated virtual address of an identified address translation of the cached group, the translation extension unit returns the one of the physical addresses that is mapped to the identified address translation to the client without transmitting the translation request to the memory management unit.

In some embodiments, when the target virtual address of the translation request is not the same as the allocated virtual address of any of the address translations of the cached group, the translation extension unit transmits the translation request to the memory management unit. In some embodiments, when the target virtual address of the translation request is not the same as the allocated virtual address of any of the address translations of the cached group, the memory management unit returns the address translation of the plurality of address translations whose virtual address is the same as the target virtual address to the client based on at least one of the translation lookaside buffer and the page table. In some embodiments, when the memory management unit returns the address translation of the plurality of address translations whose virtual address is the same as the target virtual address to the client, the translation extension unit adds the address translation to the cached group stored on the client address translation cache.

In some embodiments, the memory management unit generates invalidation messages indicating one or more of the address translations are no longer valid and the translation extension unit updates values of one or more invalidation counters based on the invalidation messages. In some embodiments, each time the translation extension unit adds an address translation to the cached group, the translation extension unit records and associates the values of the invalidation counters at that time with that address translation as associated values within the client address translation cache. In some embodiments, the translation extension unit removes selected address translations of the cached group from the client address translation cache when the associated values of the selected address translation do not match current values of the invalidation counters. In some embodiments, the translation extension unit determines whether the associated values of each of the address translations within the cached group do not match current values of the invalidation counters each time the translation extension unit adds a new address translation to the cached group.

In some embodiments, there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type. In some embodiments, when any of the invalidation counters reach a maximum value the translation extension unit resets all of the invalidation counters and removes all of the address translations of the cached group from the client address translation cache.

A second aspect is directed to a translation extension unit for operating with a main memory, a central processing unit, and a client, the main memory storing system data at a plurality of physical addresses and a page table including a plurality of address translations that map a plurality of virtual addresses to the plurality of physical addresses, the central processing unit including a memory management unit and a translation lookaside buffer storing a subset of the address translations of the page table, and the client configured to generate a translation request, wherein the client is allocated one or more allocated virtual addresses of the plurality of virtual addresses, the translation request includes a target virtual address of the allocated virtual addresses, and the client associates the target virtual address with target data of the system data. The translation extension unit comprises a non-transitory computer readable medium storing a client address translation cache including a cached group of the address translations, wherein each address translation of the cached group includes one of the allocated virtual addresses and one of the physical addresses that is mapped to the one of the allocated virtual addresses and a translation extension unit controller coupled with the client address translation cache for controlling the cache, wherein when the target virtual address of the translation request is the same as the allocated virtual address of an identified address translation of the cached group, the translation extension unit controller returns the one of the physical addresses that is mapped to the identified address translation to the client without transmitting the translation request to the memory management unit.

In some embodiments, when the target virtual address of the translation request is not the same as the allocated virtual address of any of the address translations of the cached group, the translation extension unit controller transmits the translation request to the memory management unit. In some embodiments, when the target virtual address of the translation request is not the same as the allocated virtual address of any of the address translations of the cached group, the translation extension unit controller receives the address translation of the plurality of address translations whose virtual address is the same as the target virtual address based on at least one of the translation lookaside buffer and the page table from the memory management unit. In some embodiments, the translation extension unit adds the address translation received from the memory management unit to the cached group stored on the client address translation cache.

In some embodiments, the translation extension unit controller receives invalidation messages from the memory management unit indicating one or more of the address translations are no longer valid and updates values of one or more invalidation counters based on the invalidation messages. In some embodiments, each time the translation extension unit controller adds an address translation to the cached group, the translation extension unit controller records and associates the values of the invalidation counters at that time with that address translation as associated values within the client address translation cache. In some embodiments, the translation extension unit controller removes selected address translations of the cached group from the client address translation cache when the associated values of the selected address translation do not match current values of the invalidation counters. In some embodiments, the translation extension unit controller determines whether the associated values of each of the address translations within the cached group do not match current values of the invalidation counters each time the translation extension unit controller adds a new address translation to the cached group.

In some embodiments, there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type. In some embodiments, when any of the invalidation counters reach a maximum value the translation extension unit controller resets all of the invalidation counters and removes all of the address translations of the cached group from the client address translation cache.

Another aspect is directed to a method of implementing an address translation system. The method comprises storing, with a non-transitory computer-readable main memory, system data at a plurality of physical addresses and a page table including a plurality of address translations that map a plurality of virtual addresses to the plurality of physical addresses, storing, with a memory management unit of a central processing unit, a subset of the address translations of the page table in a translation lookaside buffer, generating a translation request with a client, wherein the client is allocated one or more allocated virtual addresses of the plurality of virtual addresses, the translation request including a target virtual address of the allocated virtual addresses, and the client associates the target virtual address with target data of the system data, storing, with a translation extension unit dedicated to the client and having a client address translation cache, a cached group of the address translations, wherein each address translation of the cached group includes one of the allocated virtual addresses and one of the physical addresses that is mapped to the one of the allocated virtual addresses and when the target virtual address of the translation request is the same as the allocated virtual address of an identified address translation of the cached group, returning, with the translation extension unit, the one of the physical addresses that is mapped to the identified address translation to the client without transmitting the translation request to the memory management unit.

In some embodiments, the method further comprises, when the target virtual address of the translation request is not the same as the allocated virtual address of any of the address translations of the cached group, transmitting the translation request to the memory management unit with the translation extension unit. In some embodiments, the method further comprises, when the target virtual address of the translation request is not the same as the allocated virtual address of any of the address translations of the cached group, returning the address translation of the plurality of address translations whose virtual address is the same as the target virtual address to the client with the memory management unit based on at least one of the translation lookaside buffer and the page table. In some embodiments, the method further comprises, when the memory management unit returns the address translation of the plurality of address translations whose virtual address is the same as the target virtual address to the client, adding the address translation to the cached group stored on the client address translation cache with the translation extension unit.

In some embodiments, the method further comprises generating invalidation messages indicating one or more of the address translations are no longer valid with the memory management unit and updating values of one or more invalidation counters based on the invalidation messages with the translation extension unit. In some embodiments, the method further comprises, each time the translation extension unit adds an address translation to the cached group, recording and associating the values of the invalidation counters at that time with that address translation as associated values within the client address translation cache with the translation extension unit. In some embodiments, the method further comprises removing selected address translations of the cached group from the client address translation cache with the translation extension unit when the associated values of the selected address translation do not match current values of the invalidation counters.

In some embodiments, the method further comprises determining whether the associated values of each of the address translations within the cached group do not match current values of the invalidation counters with the translation extension unit each time the translation extension unit adds a new address translation to the cached group. In some embodiments, there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type. In some embodiments, the method further comprises when any of the invalidation counters reach a maximum value, resetting all of the invalidation counters and removing all of the address translations of the cached group from the client address translation cache with the translation extension unit.

A fourth aspect is directed to an address translation system. The system comprises means for storing system data at a plurality of physical addresses and a page table including a plurality of address translations that map a plurality of virtual addresses to the plurality of physical addresses, means for processing coupled with the means for storing and including a memory management unit and a translation lookaside buffer storing a subset of the address translations of the page table, means for generating a translation request, wherein the means for generating is allocated one or more allocated virtual addresses of the plurality of virtual addresses, the translation request including a target virtual address of the allocated virtual addresses, and the means for generating associates the target virtual address with target data of the system data and means for translating having a client address translation cache storing a cached group of the address translations, wherein each address translation of the cached group includes one of the allocated virtual addresses and one of the physical addresses that is mapped to the one of the allocated virtual addresses, wherein when the target virtual address of the translation request is the same as the allocated virtual address of an identified address translation of the cached group, the means for translating returns the one of the physical addresses that is mapped to the identified address translation to the means for generating without transmitting the translation request to the memory management unit.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a client address translation system, method and device including a translation extension unit associated with a client and having a client address translation cache storing a cached group of virtual to physical address translations. When virtual address of a translation request from the client is the same as the virtual address of an address translation of the cached group, the translation extension unit returns the physical address that is mapped to the virtual address according to the address translation to the client without transmitting the translation request to a memory management unit that maintains a page table of all the translations and a translation lookaside buffer with a subset of the translations. As a result, the client address translation system, method and device is able to avoid sending some of its transaction requests to the memory management unit and thereby improve the speed and efficiency with which the system processes address translations by reducing the address translation bottleneck that can occur at the memory management unit.

Further, the translation extension unit is able to maintain one or more invalidation counter that incrementally track each time the memory management unit sends a message indicating that one or more address translations are no longer valid. At the same time, the translation extension unit is able to record the state/value of the invalidation counters each time a new address translation is added the client address translation cache as an entry/value(s) associated with the new translation in the cache. Consequently, the translation extension unit is able to compare the entry values with the current invalidation counter values to determine whether an invalidation message has been received since the associated address translation was added and then remove any such address translations as possibly being invalid. Thus, system provides the advantage of removing invalid address translations in a manner that is less complex that what is required by the memory management unit, but is still effective for the client specific client address translation cache.

Figure 1:
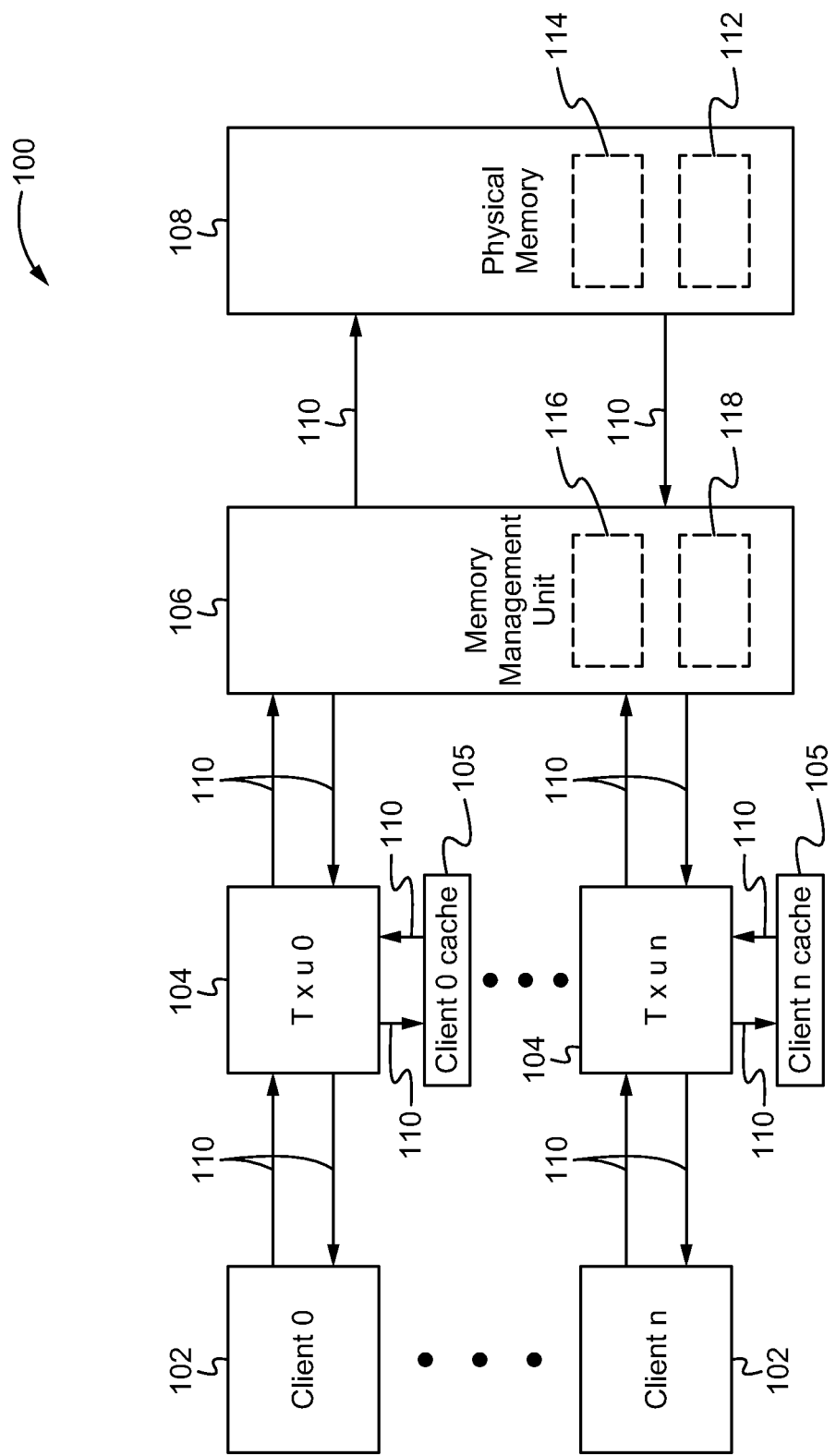
FIG. 1 illustrates an address translation processing system according to some embodiments.

FIG. 1 illustrates an address translation processing system 100 according to some embodiments. As shown in FIG. 1, the address translation processing system 100 comprises a one or more clients 102, one or more translation extension units (TXUs) 104, one or more client caches 105, a memory management unit (MMU) 106 and a physical memory 108 all coupled together via one or more wired or wireless networks 110 (e.g. buses, communication interfaces, adapters). In some embodiments, the system 100 is a part of an integrated circuit configured for processing packets/packet data. For example, in some embodiments the system 100 is able to be integrated into a network switch for inputting, processing and routing packets to desired destinations. In some embodiments, the MMU 106 is able to be a part of a central processing unit (CPU) separate from the clients 102, and the memory 108 is able to be a main memory separate from the CPU/MMU 106 and the clients 102. As a result, accessing the memory 108 with the MMU 106 is slower than accessing local memory on the CPU/MMU 106, and accessing the CPU/MMU 106 with the clients 102/TXUs 104 is slower than accessing the client caches 105.

In some embodiments, the TXUs 104 and/or client caches 105 are able to be a part of the clients 102 (e.g. stored on local memory of and/or implemented by the hardware/ software of the clients 102). Alternatively, the TXUs 104 and/or client caches 105 are able to be a part of the CPU/MMU 106 (e.g. stored on local memory of and/or implemented by the hardware/software of the CPU/MMU 106). Alternatively, the client caches 105 are able to be a part of the clients 102 (e.g. stored on the client local memory) whereas the TXUs 104 are a part of the CPU/MMU 106 (e.g. stored on local memory of and/or implemented by the hardware/software of the CPU/MMU 106). In any case, the separation of the clients 102, the MMU 106 and the physical memory 108 means that address translations requiring access to the memory 108 will be slower than translations only requiring access to the MMU 106 (or CPU), which will be slower than translations only requiring access to the client caches 105.

Although as shown in FIG. 1, the system 100 comprises two clients 102 and two TXUs 104, more or less clients 102 and/or TXUs 104 are contemplated. Further, although as shown in FIG. 1, each of the clients 102 is coupled with a single separate TXUs 104 and corresponding client cache 105 (e.g. each TXU 104 and/or cache 105 is dedicated to a single client 102), in some embodiments a plurality of clients 102 are able to share a single TXU 104 and corresponding client cache 105. Alternatively or in addition, in some embodiments a plurality of TXUs 104 each dedicated to a separate client 102 are able to share a single client cache 105.

The memory 108 is able to comprise one or more of main memory, global memory, dynamic random access memory (DRAM), random access memory (RAM), static random access memory (SRAM), remote storage, storage media, global system memory, memory modules, or other types of memory. The memory 108 is able to store system data 112 (e.g. data that is used by the clients 102 to perform one or more functions of the system 100) at one or more physical memory addresses. Further, the memory 108 is able to store one or more page tables 114 that map a plurality of virtual addresses to the physical memory addresses. As described above, the physical memory 108 is able to be separate from the MMU 106 such that accessing the memory 108 to walk the page table(s) 114 is a slow process.

Each of the clients 102 is able to be assigned a set of virtual addresses that map to one or more of the physical addresses of the memory 108. In some embodiments, the virtual addresses assigned to each client 102 are able to be a subset of the virtual addresses utilized by the system 100. The clients 102 are then able to use these virtual addresses to reference the location of system data 112 stored on the memory 108 that the clients 102 need for operation. The clients 102 are able to comprise applications, peripherals, programs, kernel, processes or other components that are assigned a set of virtual addresses for utilizing the memory 108 (and the system data 112 stored thereon). For example, one or more of the clients 102 is able to be data center interconnect and/or data circuit terminating equipment. The clients 102 are able to comprise client local memory, processing components, and/or other hardware/software for generating address translation requests, receiving the requested translations and/or performing other client functions. As described above, in some embodiments some or all of the clients caches 105 and/or the TXUs 104 is able to be stored on the client local memory. Similarly, some or all of the functions of the TXUs 104 are able to be performed by the processing components and/or other hardware/software of the clients 102.

The MMU 106 translates virtual addresses to physical addresses and is able to comprise a translation lookaside buffer 116 (TLB) and a finite state machine 116. Specifically, the MMU 106 is able to receive address translation requests including virtual addresses that are requested to be translated into the associated physical addresses (according to the page table 114). The MMU 106 is able to look up the virtual addresses in the TLB 116 or the page table 114 and return address translations that for each of the virtual addresses indicates the corresponding physical address. The TLB 116 and/or finite state machine 116 is able to be stored on the MMU 106 local memory (e.g. the local memory of a CPU including the MMU 106). The TLB 116 caches one or more table entries of the page table 114 such that it includes a subset of the address translations found in the page table 114. As a result, if the address translation corresponding to a virtual address is in the TLB 116, the MMU 106 is able to translate the virtual address to a physical address (e.g. respond with the corresponding address translation) without needing to access the page table 114 on the memory 108. However, if the corresponding address translation is not found in the TLB 116 (an event called a TLB miss), the MMU 106 must access the memory 108 and search/walk the page table 114 for the desired address translation.

The MMU 106 is also able to generate invalidation messages that indicate one or more of the address translations that are no longer valid (e.g. the physical address and the virtual address of the translation no longer correspond to each other). There are able to be a plurality of different types of these invalidation messages depending on what types of translations they are invalidating. For example, the types of invalidation messages are able to include: invalidate all type invalidation messages that indicate that all the transactions are no longer valid; address space identifier (ASID) type invalidation messages that indicate that translations associated with an application corresponding to the ASID are no longer valid; ASID and virtual machine identifier (VMID) type invalidation messages that indicate that translations associated with an application (corresponding to the ASID) of a virtual machine (corresponding to the VMID) are no longer valid; virtual address (VA), ASID and VMID type invalidation messages that indicate that transactions associated with virtual addresses (corresponding to the VA) of an application (corresponding to the ASID) of a virtual machine (corresponding to the VMID) are no longer valid; and long format (LF) type invalidation messages that indicate that all the transactions associated with the long format are no longer valid. Additionally, the MMU 106 is able to generate synchronization messages that indicate the desire to synchronize with the client 102.

The client caches 105 are able to store one or more address translations that indicate the physical addresses corresponding to virtual addresses for which the translation was requested by the client 102 (in a translation request message). Further, the client caches 105 are able to associate each address translation within the cache 105 with invalidation counter values (for each of the associated invalidation counters). In particular, when a new translation is added to the cache 105, the values of the invalidation counters at that time are stored with the translation so that later they can be compared with current invalidation counter values in order to determine if the transaction is no longer valid and should be deleted. Thus, if there are three types of invalidation counters (e.g. VA/VMID/ASID counters; VMID/ASID counters; and ASID counters), there will be three counter values associated with the translation in the cache 105.

The TXUs 104 are coupled with a client cache 105 and between the clients 102 and the MMU 106 such that the TXUs 104 are able to intercept translation requests from the clients 102, translation responses 106 from the MMU 106, invalidation and/or synchronization messages from the MMU 106, and synchronization responses from the clients 102. The TXUs 104 use these messages to populate and maintain one or more address translations within the client cache 105 such that not all of the translation requests need to be forwarded to the MMU 106. Additionally, the TXUs 104 establish and maintain the invalidation counters in order to know when and which of the translations within the cache 105 to delete based on received invalidation messages from the MMU 106. The TXUs 104 are able to be implemented in hardware, software or a combination thereof. Further, as described above, the TXUs 104 are able to be implemented by/incorporated into the client 102 (e.g. utilize the client local memory and local processor(s)) and/or be implemented by/incorporated into the MMU 106 (e.g. utilize the MMU local memory and local processor(s) (or that of the CPU including the MMU 106)).

In operation, a client 102 generates and transmits an address translation request to the corresponding TXU 104. The address translation request comprises at least a virtual address for which the client 102 wants to know the corresponding physical address (e.g. the virtual address that needs to be translated). Upon receiving the request, the TXU 104 identifies the virtual address whose translation is being requested within the request and checks the client cache 105 to determine if the translation for that virtual address is already within the client cache 105. For example, the TXU 104 is able to determine if any of the virtual address of any of the address translations stored in the cache 105 match the virtual address of the request. If the translation for that virtual address is within the client cache 105, the TXU 104 generates and transmits an address translation response to the client 102 including the corresponding address translation without forwarding the request to the MMU 106. As a result, the system 100 (e.g. the TXU 104 and client cache 105) provides the benefit of reducing the quantity of requests that need to be processed by the MMU 106 and thereby increase the address translation speed and efficiency of the system 100. On the other hand, if the translation for that virtual address is not within the client cache 105, the TXU 104 forwards the translation request to the MMU 106 and waits for a response from the MMU 106.

The MMU 106 receives the request and first checks if the corresponding translation is found in the TLB 116 in the same manner that the TXU 104 checks the client cache 105. For example, the MMU 106 is able to dissect the virtual address into the virtual page number (e.g. the first portion of the virtual address) and the page offset (e.g. the last bits of the virtual address). The virtual page number is looked up as an index/key in the TLB 116 for a corresponding physical address (e.g. physical page number). If an entry having a tag/value matching the virtual page number and a corresponding physical address (or physical page number) is found in the TLB 116, the MMU 106 forms the address translation response (including the corresponding physical address and/or other desired information) and transmits the response (including the corresponding translation) to the TXU 104. If an entry having a tag/value matching the virtual page number and a corresponding physical address (or physical page number) is not found in the TLB 116, the MMU 106 accesses and walks the page table 114 on the memory 108 (e.g. using the virtual page number as the key/index) to form the address translation response (including the corresponding physical address and/or other desired information such as, but not limited to, the virtual address, an ASID and/or a VMID to which the translation corresponds). The MMU 106 then transmits the translation response (including the corresponding translation) to the TXU 104. In either case, the forming of the address translation is able to comprise appending the page offset from the virtual address to the end of the physical page number found in the TLB 116 to form the physical address. Alternatively, other methods of checking the TLB 116 and/or forming the corresponding translation are able to be used.

Upon receiving the translation response from the MMU 106, the TXU 104 is able to both forward the response to the client 102 and add the address translation to the client cache 105. In particular, the TXU 104 is able to store the virtual address and the corresponding physical address together as a new entry in the cache 105 such that if the same virtual address is found in a subsequent address translation request from the client 102, the TXU 104 will be able to match the virtual address of the request with the virtual address of the new entry and return the corresponding physical address/translation to the client 102 without utilizing the MMU 106. Additionally, in some embodiments when adding the new entry to the cache 105, the TXU 104 is able to associate additional data with the entry/physical address/translation. The additional data is able to include one or more of the virtual address of the translation, an enable bit, an ASID of the translation, a VMID of the translation and/or entry invalidation values that are equal to the values of each of the invalidation counters (see FIG. 2) at the time the new entry was added. Additionally, in some embodiments, whenever the TXU 104 adds a new entry, it checks whether any of the entry invalidation values of any of the entries no longer match the current values of the corresponding invalidation counters and deletes and/or invalidates those entries/translations as no longer valid (e.g. via changing the value of the enable bit to indicate not enabled). As a result, the system 100 provides the advantage of enabling the client cache 105 to be updated to reflect when one or more of the translations are indicated as no longer being valid by the MMU 106.

In some embodiments, the address translation request is able to be labeled as a bypass request by including a bypass flag. In such embodiments, upon receiving the request, if the TXU 104 determines there is a bypass flag, the TXU 104 forwards the translation request to the MMU 106 without determining whether the translation/physical address for the virtual address of the request is already in the client cache 105. Similarly, upon receiving the response to the request from the MMU 106, the TXU 104 forwards the translation response to the client 102 without adding the translation/physical address of the response to the client cache 105. In this manner, the system 100 provides the benefit of enabling the TXU 104 to be bypassed if necessary in certain circumstances.

Also in operation, the MMU 106 is able to generate and transmit invalidation messages to the TXU 104 indicating that one or more of the address translations are no longer valid. Each of the invalidation messages is able to include an invalidation type indicator (e.g. ASID; VMID/ASID; VA/VMID/ASID type) and values for that type which indicate which type of the translations the invalidation message corresponds to (and thus which of the invalidation counters to increment). Upon receiving an invalidation message, the TXU 104 identifies the type of invalidation message based on the indicator and determines the values of the invalidation message for that type. For example, if the message is VA/VMID/ASID type, the TXU 104 determines the value of the VA, the VMID and the ASID of the invalidation message, determines which of the invalidation counters has an identifier that corresponds to those values and increments that invalidation counter. For example, the TXU 104 is able to determine a hash or other mathematical operation and/or combination of the values and determine which of the invalidation counters has a counter identifier that matches the result of the combination/operation and increment that counter. Thus, if an invalidation message is VMID/ASID type, the counter identifier is able to be equal to a hash of the VMID value concatenated with the ASID value. Alternatively, other combinations/operations are able to be used (including using the unchanged values themselves), with the invalidation counter identifiers adjusted to correspond to the selected combinations/operations and type values. If the counter reaches its maximum value, the TXU 104 is able to reset at least that counter and/or reset all of the counters and delete/invalidate all of the translations in the cache 105. In some embodiments, the invalidation messages are able to include an invalidate all type, wherein upon determining that the invalidation message is an invalidate all type, the TXU 104 resets all of the invalidation counters.

As described above, when a new entry is being added to the client cache 105, the TXU 104 is able to identify which of the invalidation counters correspond to the new entry by performing the combination/operation on the type values of the translation/entry and determining which invalidation counter identifiers match the results. For example, the TXU 104 is able to perform the operation on the ASID of the entry to determine an ASID type invalidation counter having a matching identifier, perform the operation on the VMID and ASID of the entry to determine a VMID/ASID type invalidation counter having a matching identifier, and perform the operation on the VA, VMID and ASID of the entry to determine a VA/VMID/ASID type invalidation counter having a matching identifier.

Subsequently, once each of the corresponding invalidation counters are identified, the TXU 104 is able to record the current values of those invalidation counters in the entry on the client cache 105 (as well as recording the corresponding invalidation counter identifier and/or the entry values used to determine the identifier). As a result, when determining whether an entry/translation is still valid, the TXU 104 is able to fetch the current values from the invalidation counters identified/corresponding to the entry and determine whether those current value still match values for that counter that were recorded in the entry when it was created. If the one or more of the values no longer match, it means that at least one invalidation message of that type and/or invalidate all message has been received since the creation/adding of that entry and so the entry/translation needs to be deleted/invalidated as no longer being valid. Thus, the system/TXU provides the advantage of keeping the client cache 105 entries valid while not requiring a complicated invalidation protocol.

In some embodiments, the MMU 106 is further configured to periodically transmit synchronization request messages to the clients 102 (via the TXU 104) in order to synchronize data on the MMU 106 with data on the clients 102. Upon receipt of a synchronization message, the TXU 104 temporarily stops accepting new translation requests from the client 102 and stores the synchronization message until all of the pending translation request have been processed (e.g. by responding with the requested translation from the cache 105 and/or the MMU 106, by adding new translations to the cache 105, and/or by deleting invalid translations from the cache 105). Once all of the pending translation requests have been processed, the TXU 104 transmits the synchronization request to the client 102. The client 102 generates and transmits a synchronization response to the TXU 104, which forwards the synchronization response to the MMU 106. As a result, the system 100 provides the benefit of ensuring that the client cache 105 is completely up to date (with all pending additions and deletions made) before permitting the client 102 and the MMU 106 to synchronize.

Figure 2:
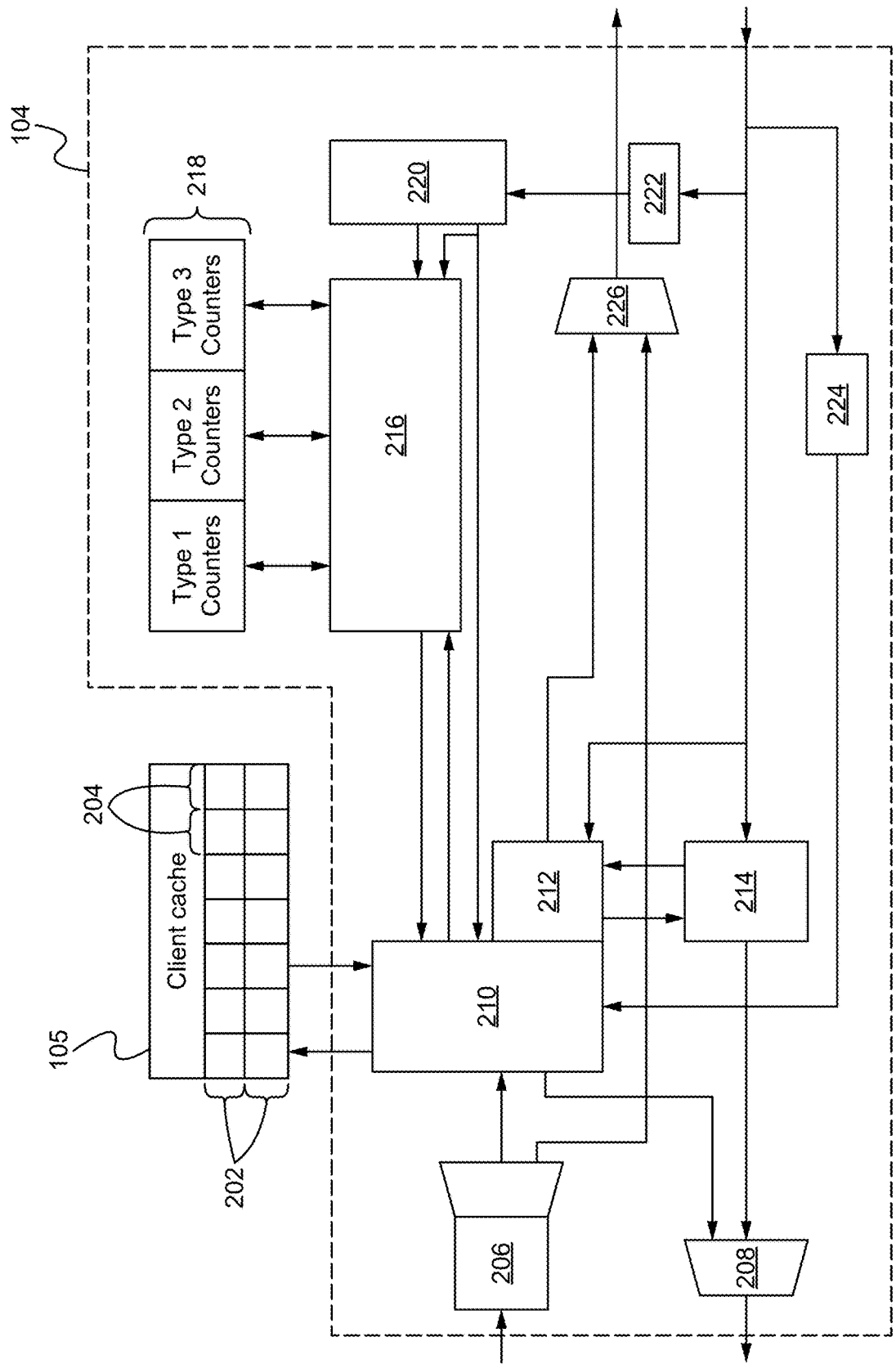
FIG. 2 illustrates a detailed view of a translation extension unit coupled with a client cache according to some embodiments.

FIG. 2 illustrates a detailed view of a TXU 104 coupled with a client cache 105 according to some embodiments. As shown in FIG. 2, the cache 105 comprises one or more entries 202 each including a plurality of fields 204. In some embodiments, the fields are able to include a physical address field, a virtual address field, an enable field, a ASID field, a VMID field and/or one or more invalidation counter value fields (e.g. at least one for each type of invalidation counter in the invalidation counter array 218). Alternatively, one or more additional fields are able to be added and/or one or more of the above fields are able to be omitted. The physical address, virtual address, ASID and VMID fields are able to include the value of the physical address, virtual address, ASID and VMID of the translation stored in that entry, respectively. The enable field is able to indicate whether the entry/translation is currently valid or invalid. The invalidation counter value fields are able to include the value of the associated invalidation counter at the time the translation was added to the entry of the cache 105. For example, if the invalidation counter field relates to an ASID type invalidation counter, the value of the field will be the value of the ASID type invalidation counter having a matching ASID (as modified by a predetermined hash/combination/operation) at the time the translation was added to the entry of the cache 105.

As also shown in FIG. 2, TXU 104 comprises an input buffer 206, an output component 208 (e.g. output buffer), a TXU controller 210, a pending request block 212, a synchronization block 214, a counter array controller 216, an invalidation counter array 218, an invalidation message block 220, an invalidation command translator 222, a command parser 224 and an output interface 226. Alternatively, one or more additional fields components are able to be added and/or one or more of the above components are able to be omitted, divided into multiple components or combined into a single component.

The input buffer 206 is able to receive translation requests from one or more of the clients 102 and forward the requests to the TXU controller 210. In embodiments utilizing bypass requests, the input buffer 206 is able to determine if the request is a bypass request and forward all bypass requests directly to the MMU 106 and all non-bypass requests to the TXU controller 210. Additionally, the input buffer 206 is able to receive synchronization responses from the clients 102 and forward the responses directly to the MMU 106 (similar to the bypass requests). The output component 208 is able to receive translation responses from the TXU controller 210, and translation responses and synchronization requests from the MMU 106 (via the synchronization control 214). In either case, the output component 208 is able to output the translation responses and synchronization requests to one or more of the clients 102.

The TXU controller 210 is able to receive translation requests from the input buffer 206 and check if the requests match any of the entries/translations within the client cache 105. Specifically, as described above, the controller 210 is able to check if the virtual address of any of the translations within the cache 105 match the virtual address of the translation request. If there is a match, the controller 210 generates and sends a translation response message (including the requested physical address and/or translation) to the output component 208. If there is not a match, the controller 210 passes the request to the pending request block 212 which forwards the request to the MMU 106 (via the output interface 226) and waits for a response. The pending request block 212 maintains a queue of all the translation requests that are still awaiting a response from the MMU 106, wherein it adds each newly received request to the queue before forwarding it to the MMU 106 and removes a request from the queue upon receiving the corresponding request from the MMU 106 before forwarding the response back to the TXU controller 210.

Upon receiving a translation response from the pending request block 212, the TXU controller 210 adds the translation of the response as a new entry in the client cache 105 and forwards the response to the client 102 (via the output component 208). Alternatively, the synchronization block 214 is able to also receive a copy of the translation response/message and forwards the response to the client 102 via the output component 208 (such that the controller 210 does not need to).

As described above, the adding of the transaction to an entry 202 of the cache 105 is able to comprise inputting the values of the transaction into each of the corresponding fields 204 of the entry 202 including requesting, receiving and entering the current values of the corresponding invalidation counters of the counter array 218 from the counter array controller 216. In particular, the TXU controller 210 is able to transmit the values of the transaction used to determine the corresponding counters (e.g. the VA, the ASID and/or the VMID) to the array controller 216, which is then able to determine the corresponding counters (and their current values) based on the received values of the transaction (e.g. by performing a hash, combination and/or other operation with one or more of the values) and transmit the values to the controller 210 for recording in the appropriate fields 204 of the entry 202. Alternatively, instead of sending the values to the array controller 216 to determine the identifiers of the corresponding counters, the TXU controller 210 is able to determine the identifiers of the corresponding invalidation counters based on the values of the transaction itself, and then transmit the identifiers to the array controller 216 which then responds with the current values of those invalidation counters. Further, the TXU controller 210 is able to set the enable field (if one exists) to a value indicating that the entry/translation 202 is currently valid.

Additionally, each time the TXU controller 210 adds a new translation to the cache 105, the controller 210 is able to check whether any of the existing entries/translations 202 are no longer valid. Specifically, as described above, for each of the entries 202, the controller 210 is able to request the current values of the corresponding invalidation counters from the array controller 216 (in the same manner as when adding a new entry) and compare each of those current values with the value stored in the corresponding invalidation counter field 204 of the entry 202. When the values are not equal (or the entry value is lower than the counter value), the TXU controller 210 deletes and/or disables the entry/translation 202 as no longer being valid. For example, the controller 210 is able to set the enable field (if one exists) to a value indicating that the entry/translation 202 is not valid or is able to clear all the values of the entry 202. Alternatively or in addition to checking each time a new translation is added, the TXU controller 210 is able to check whether any of the entries/translations 202 need to be deleted/invalidated periodically (e.g. at a predetermined frequency/period), upon request by the client 102 and/or MMU 106, and/or according to another checking schedule.

Additionally, in some embodiments the TXU controller 210 is able to receive an invalidate all message from the MMU 106 (via the invalidation message block 220 and the invalidation command translator 222). The invalid all message/command indicates that all of the entries/translations 202 are now invalid. Accordingly, upon receiving the invalidate all message, the TXU controller 210 deletes and/or disables all the entries/translations 202 currently in the cache 105 as no longer being valid.

Now referring again to the pending request block 212 and the synchronization block 214, concurrently with the monitoring of the translation requests, transaction responses and/or the processing thereof, the pending request block 212 is able to also monitor for synchronization requests received from the MMU 106 via the synchronization control block 214. Upon receiving a synchronization request, the pending request block 212 notifies the controller 210 to stop accepting additional requests until the synchronization is complete and monitors the number of translation requests in the request queue. When the request queue is empty (e.g. all the pending translation requests have been responded to by the MMU 106, forwarded to the client 102 and/or the responses processed/added to the cache 105 by the controller 210), the pending request block 212 notifies the synchronization control block 214 to forward the synchronization request to the client 102 (via the output component 208) and/or notifies the TXU controller 210 that it can resume processing new translation requests after a synchronization response is received from the client 102 and forwarded to the MMU 106. In particular, upon receipt of a synchronization response message from the client 102, the input buffer 206 is able to transmit the message to the output interface 226 which forwards the message to the MMU 106.

The invalidation counter array 218 is able to be stored on memory (e.g. random access memory) and comprise a plurality of invalidation counters each having a counter identifier and being at least one of one or more invalidation types. Specifically, each of the invalidation messages/commands have a type in that they relate to the invalidation of particular translations or groups of translations (e.g. translations with/relating to certain ASIDs, translations with/relating to certain combinations of ASIDs and VMIDs, translations with/relating to certain combinations of ASIDs, VMIDs and virtual addresses, all translations, LF translations, or other groups of translations). And thus, each of the invalidation counters are able to have a type that matches the type of the invalidation commands that they are used to count. Additionally, these counter/invalidation message types are able to identify particular values/parameters that are used to calculate the counter identifier of each of the counters (e.g. using a hash or other function on the particular values).

For example, an invalidation counter of the array 218 is able to be an ASID type and have a counter identifier that is derived from the ASID of the translation and/or invalidation message to which it relates (e.g. the ASID type indicates that the ASID value is the particular value/parameter used to determine the identifier). Therefore, if the operation used to calculate the counter identifiers was programmed to be a hash operation, then the counter identifier of each invalidation counter of the ASID type, will be the result of taking the hash of the ASID of the invalidation message and/or translation to which it relates. Similarly, if a hash function is used for ASID/VMID type counters, the counter identifiers are able to be a hash of the concatenation of the ASID and the VMID of the invalidation message and/or translation to which the counter relates. Alternatively, as described herein, non-hash functions are able to be used with the same or different types of invalidation messages having the same or different particular values/parameters for calculating the counter identifiers.

Accordingly, whenever an invalidation message having one of those types is received, the counter array controller 116 is able to perform the hash or other function on the particular values for that type of invalidation message (e.g. the ASID, both the ASID and the VMID, all of the ASID, the VMID and the VA, or other values) and thereby determine a result that matches the counter identifier of the corresponding invalidation counter of the array 218 (which it can then increment based on that invalidation message). In other words, in this manner, regardless of what operation (e.g. hash, other operation, no operation, or a combination of operations) is used, the invalidation counters are able to be indexed according to their counter identifiers and for each received invalidation message the controller 216 is able to determine which of the counters to increment by identifying the invalidation type of the invalidation message, extracting the values of the message that relate to that type, performing the identifier-determining operation (e.g. hash) on those values, finding the invalidation counter whose identifier matches the result of the operation, and incrementing that invalidation counter. In some embodiments, if the incrementing would cause the counter to overflow or reach its maximum value, the controller 216 is able to reset all the counters (and/or send an invalidate all message to the TXU controller 210). Similarly, in the case where the received invalidation message is not one of the types found in the array 218, the array controller 216 is able to reset all of the counters (and/or send an invalidate all message to the TXU controller 210). Alternatively, in the case where the received invalidation message is not one of the types found in the array 218, the array controller 216 is able to disregard the message for the purposes of incrementing as not being relevant to the counters.

In this same manner, when the TXU controller 210 requests the current value of one or more of the counters, the counter array controller 216 is able to receive the particular values from the controller 210 for one or more of the invalidation types, perform the function (e.g. hash) on the values to determine the counter identifiers for each of the types, and return the current values of the counters having those determined counter identifiers to the TXU controller 210 (such that it can record them in the new translation/entry 202). Alternatively, the TXU controller 210 is able to perform the counter identifier calculation and transmit the identifiers to the counter array controller 216 such that the array controller 216 only needs to find and return the values of the counters having matching counter identifiers to the TXU controller 210.

Although as shown in FIG. 2, the array 218 includes three types of invalidation counters (e.g. ASID counters, VMID/ASID counters and VA/VMID/ASID counters), more or less types and/or different types are able to be used. For example, only one or two types are able to be used in the array 218, or four or more types are able to be used. In general, the more types that are tracked using the counter array 218, the more accurately the TXU controller 210 is able to maintain the client cache 105, (but the more memory/processing required). As a result, the array 218 and/or counter array controller 216 provide the benefit of enabling the accuracy of the client cache 105 to be maintained and/or adjusted based on the number of invalidation message types counted without expending significant processing and memory resources.

The invalidation command translator 222 is able to receive the invalidation commands from the MMU 106 and translate them to formats/commands/messages that are able to be understood by the TXU 104. The invalidation command translator 222 is then able to transmit the translated invalidation commands to the invalidation message block 220. In some embodiments, this translation includes disregarding certain types of invalidation messages and/or converting different types of invalidation messages into the same type of invalidation message. Alternatively, the translator 222 is able to be omitted and the TXU 104 configured to understand the invalidation messages as received from the MMU 106. The invalidation message block 220 determines where each invalidation message needs to be sent and transmits them to that location. In particular, the block 220 is able to forward all invalidation messages having a type that corresponds to the types of the counter array 218 to the array controller 216 (so the array controller 216 can increment the appropriate invalidation counters based on the messages). Further, the block 220 is able to forward one or more types of invalidation messages (e.g. invalidate all messages) directly to the TXU controller 210. At the same time, in the case of an invalidate all message, the invalidation message block 220 is able to instruct the counter array controller 216 to reset all the invalidation counters to their initial values (e.g. zero) to reflect the clearing of all the translations from the cache 105. The command parser block 224 is able to receive and parse secure trace enabled messages from the MMU 106. The command parser block 224 is then able to transmit the parsed messages (e.g. in a long format) to the TXU controller 210. Alternatively, the command parser block 224 is able to be omitted.

Figure 3:
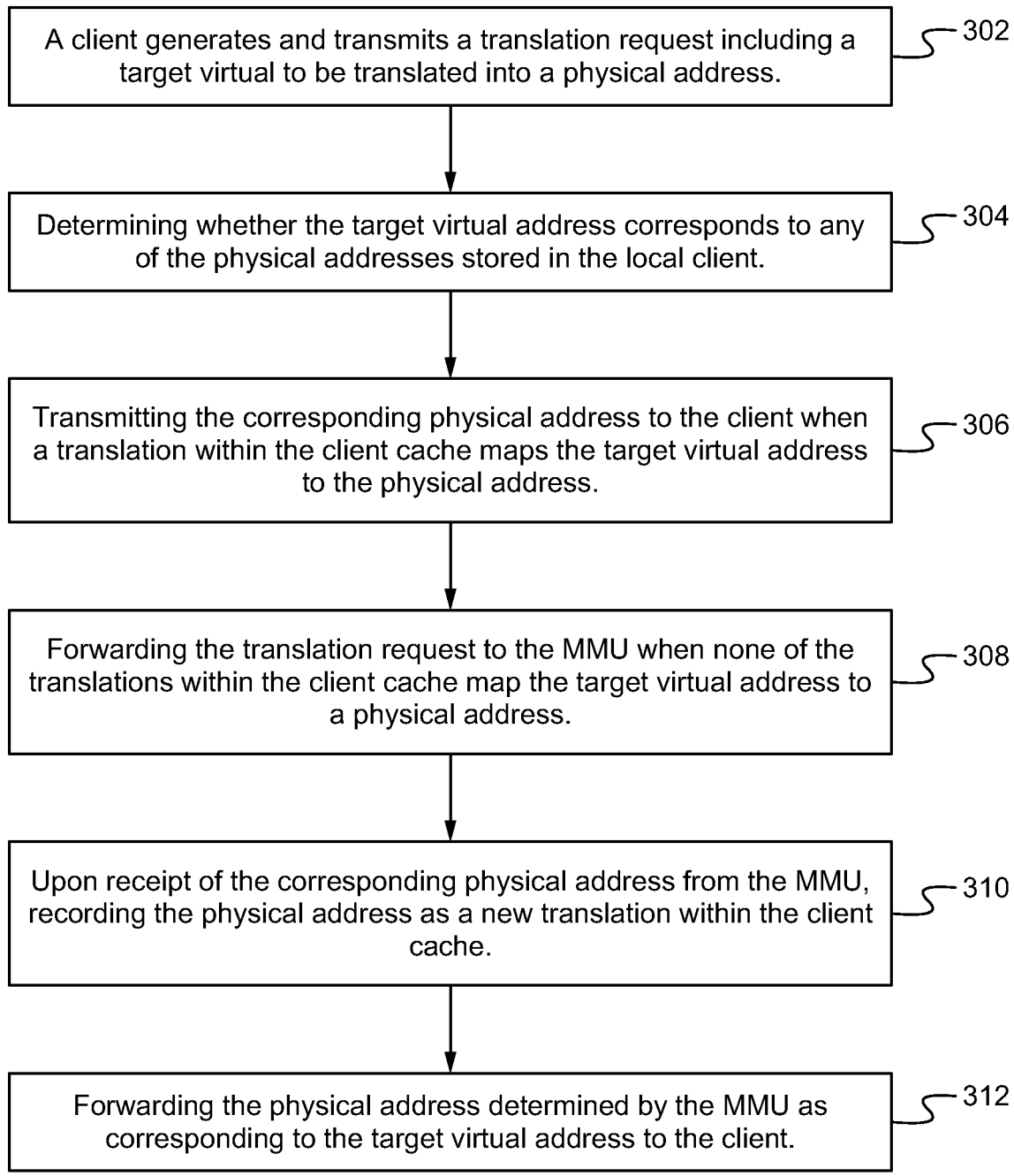
FIG. 3 illustrates a method of implementing translation processing system according to some embodiments.

FIG. 3 illustrates a method of implementing translation processing system 100 according to some embodiments. As shown in FIG. 3, a client 102 generates a translation request including a target virtual address (of the set of addresses allocated to the client 102) to be translated into a physical address at the step 302. In particular, the target virtual address is able to reference the virtual location (e.g. a starting point) of system data that the client wishes to access. The TXU 104 determines whether the target virtual address corresponds to any of the physical addresses stored in the local client cache 105 at the step 304. In particular, the TXU 104 is able to determine if the target virtual address matches the virtual address of an address translation stored in an entry 202 of the client cache 105 to determine whether the physical address of the entry 202 corresponds to the target virtual address. The TXU 104 transmits the corresponding physical address (and/or translation) when the target virtual address corresponds to one of the physical addresses within the client cache 105 without transmitting the translation request to the MMU 106 at the step 306. The TXU 104 forwards the translation request to the MMU 106 when the target virtual address does not correspond to one of the physical addresses within the client cache 105 at the step 308. Upon receipt of the physical address (and/or address translation including the physical address) corresponding to the target virtual address from the MMU 106, the TXU 104 records the physical address as a new translation associating the target virtual address and the corresponding physical address within the client cache 105 at the step 310. The TXU 104 forward the physical address (and/or address translation including the physical address) corresponding to the target virtual address to the client 102 at the step 312. As a result, the method provides the advantage of reducing the quantity of translation requests submitted to the MMU 106 thereby increasing the address translation efficiency of the system 100.

In some embodiments, the method further comprises the MMU 106 checking for the physical address that corresponds to the target virtual address within the TLB 116 first, and then the page table 114 if the target virtual address is not within the TLB 116. In some embodiments, the method further comprises the MMU 106 transmitting the corresponding physical address (e.g. the translation including the corresponding physical address), as determined based on either the TLB 116 or the page table 114, to the TXU 104. In some embodiments, the method further comprises the TXU 104 maintaining an invalidation counter array 218 including invalidation counters associated with each of the translations within the client cache 105 by incrementing the counter corresponding invalidation messages received from the MMU 106. In some embodiments, the method further comprises the TXU 104 recording, within invalidation fields 204 of an entry 202, current values of the invalidation counters that correspond to the key values of a new translation being added in the entry 202.

In some embodiments, the method further comprises the TXU invalidating/erasing one or more of the translations within the cache 105 when the values of the invalidation fields of the translation/entry 202 do not match the current values of the invalidation counters that correspond to those invalidation fields (e.g. whose counter identifier is derived from an operation performed on the key value of the translation for the type of invalidation field). In some embodiments, the method further comprises processing all of the pending translation requests before processing a synchronization message. In some embodiments, the method further comprises resetting all of the counters and/or deleting all of the translation within the cache 105 upon receipt of an invalidate all command and/or upon one of the counters reaching or exceeding its maximum value. In some embodiments, the method further comprises the TXU 104 forwarding a translation request without checking the client cache 105 when the translation request is a bypass request.

The address translation system, method and device described herein provides numerous advantages. Specifically, the system, method and device provide the benefit of reducing the quantity of requests that need to be processed by the MMU and thereby increase the address translation speed and efficiency of the system. Further, the system, method and device provides the advantage of removing invalid address translations in a manner that is less complex that what is required by the memory management unit, but is still effective for the client specific client address translation cache. In other words, the system, method and device provides the advantage of enabling the client cache to be updated to reflect when one or more of the translations are indicated as no longer being valid by the MMU. Thus, the system, method and device improves the operational efficiency and speed of the computer, processor, device and/or circuit upon which it is implemented.

While the system, method and device has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. In particular, it should be noted that although not described in detail for the sake of brevity, the components of the client 102, the TXU 104 and/or the MMU 106 (or the CPU including the MMU 106) are able to include one or more of a network interface, memory, a processor, I/O device(s), a bus and a storage device. The memory 108, the client cache 105 and/or the other memory described herein is able to be any conventional computer memory known in the art such as, but not limited to, a hard drive, DRAM, RAM, SRAM, CDROM, CDRW, DVD, DVDRW, flash memory card or any other storage device. An example of a network interface includes a network card connected to an Ethernet or other type of LAN. The I/O device(s) and/or clients 102 are able to include one or more of the following: keyboard, mouse, monitor, display, printer, modem, touchscreen, button interface and other devices. The operating system(s), graphical user interface(s), application(s), module(s) and/or other software used to operate the clients 102 are able to be stored in the memory and/or storage device and processed as applications are typically processed via the processor.

We claim:

1. An address translation system, the system comprising:
   a non-transitory computer-readable main memory storing system data at a plurality of physical addresses and a page table including a plurality of address translations that map a plurality of virtual addresses to the plurality of physical addresses;
   a central processing unit coupled with the main memory and including a memory management unit and a translation lookaside buffer storing a subset of the address translations of the page table;
   a client configured to generate a translation request, wherein the client is allocated one or more allocated virtual addresses of the plurality of virtual addresses, the translation request including a target virtual address of the allocated virtual addresses, and the client associates the target virtual address with target data of the system data; and
   a translation extension unit dedicated to the client and having a client address translation cache storing a cached group of the address translations, wherein each address translation of the cached group includes one of the allocated virtual addresses and one of the physical addresses that is mapped to the one of the allocated virtual addresses;
   wherein when the target virtual address of the translation request is the same as the allocated virtual address of an identified address translation of the cached group, the translation extension unit returns the one of the physical addresses that is mapped to the identified address translation to the client without transmitting the translation request to the memory management unit.

2. The system of claim 1, wherein when the target virtual address of the translation request is not the same as the allocated virtual address of any of the address translations of the cached group, the translation extension unit transmits the translation request to the memory management unit.

3. The system of claim 2, wherein when the target virtual address of the translation request is not the same as the allocated virtual address of any of the address translations of the cached group, the memory management unit returns the address translation of the plurality of address translations whose virtual address is the same as the target virtual address to the client based on at least one of the translation lookaside buffer and the page table.

4. The system of claim 3, wherein when the memory management unit returns the address translation of the plurality of address translations whose virtual address is the same as the target virtual address to the client, the translation extension unit adds the address translation to the cached group stored on the client address translation cache.

5. The system of claim 4, wherein the memory management unit generates invalidation messages indicating one or more of the address translations are no longer valid and the translation extension unit updates values of one or more invalidation counters based on the invalidation messages.

6. The system of claim 5, wherein each time the translation extension unit adds an address translation to the cached group, the translation extension unit records and associates the values of the invalidation counters at that time with that address translation as associated values within the client address translation cache.

7. The system of claim 6, wherein the translation extension unit removes selected address translations of the cached group from the client address translation cache when the associated values of the selected address translation do not match current values of the invalidation counters.

8. The system of claim 7, wherein the translation extension unit determines whether the associated values of each of the address translations within the cached group do not match current values of the invalidation counters each time the translation extension unit adds a new address translation to the cached group.

9. The system of claim 8, wherein there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type.

10. The system of claim 9, wherein when any of the invalidation counters reach a maximum value the translation extension unit resets all of the invalidation counters and removes all of the address translations of the cached group from the client address translation cache.

11. A translation extension unit for operating with a main memory, a central processing unit, and a client, the main memory storing system data at a plurality of physical addresses and a page table including a plurality of address translations that map a plurality of virtual addresses to the plurality of physical addresses, the central processing unit including a memory management unit and a translation lookaside buffer storing a subset of the address translations of the page table, and the client configured to generate a translation request, wherein the client is allocated one or more allocated virtual addresses of the plurality of virtual addresses, the translation request includes a target virtual address of the allocated virtual addresses, and the client associates the target virtual address with target data of the system data, the translation extension unit comprising:
 a non-transitory computer readable medium storing a client address translation cache including a cached group of the address translations, wherein each address translation of the cached group includes one of the allocated virtual addresses and one of the physical addresses that is mapped to the one of the allocated virtual addresses; and
 a translation extension unit controller coupled with the client address translation cache for controlling the cache, wherein when the target virtual address of the translation request is the same as the allocated virtual address of an identified address translation of the cached group, the translation extension unit controller returns the one of the physical addresses that is mapped to the identified address translation to the client without transmitting the translation request to the memory management unit.

12. The translation extension unit of claim 11, wherein when the target virtual address of the translation request is not the same as the allocated virtual address of any of the address translations of the cached group, the translation extension unit controller transmits the translation request to the memory management unit.

13. The translation extension unit of claim 12, wherein when the target virtual address of the translation request is not the same as the allocated virtual address of any of the address translations of the cached group, the translation extension unit controller receives the address translation of the plurality of address translations whose virtual address is the same as the target virtual address based on at least one of the translation lookaside buffer and the page table from the memory management unit.

14. The translation extension unit of claim 13, wherein the translation extension unit adds the address translation received from the memory management unit to the cached group stored on the client address translation cache.

15. The translation extension unit of claim 14, wherein the translation extension unit controller receives invalidation messages from the memory management unit indicating one or more of the address translations are no longer valid and updates values of one or more invalidation counters based on the invalidation messages.

16. The translation extension unit of claim 15, wherein each time the translation extension unit controller adds an address translation to the cached group, the translation extension unit controller records and associates the values of the invalidation counters at that time with that address translation as associated values within the client address translation cache.

17. The translation extension unit of claim 16, wherein the translation extension unit controller removes selected address translations of the cached group from the client address translation cache when the associated values of the selected address translation do not match current values of the invalidation counters.

18. The translation extension unit of claim 17, wherein the translation extension unit controller determines whether the associated values of each of the address translations within the cached group do not match current values of the invalidation counters each time the translation extension unit controller adds a new address translation to the cached group.

19. The translation extension unit of claim 18, wherein there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type.

20. The translation extension unit of claim 19, wherein when any of the invalidation counters reach a maximum value the translation extension unit controller resets all of the invalidation counters and removes all of the address translations of the cached group from the client address translation cache.

21. A method of implementing an address translation system, the method comprising:
 storing, with a non-transitory computer-readable main memory, system data at a plurality of physical addresses and a page table including a plurality of address translations that map a plurality of virtual addresses to the plurality of physical addresses;

storing, with a memory management unit of a central processing unit, a subset of the address translations of the page table in a translation lookaside buffer;

generating a translation request with a client, wherein the client is allocated one or more allocated virtual addresses of the plurality of virtual addresses, the translation request including a target virtual address of the allocated virtual addresses, and the client associates the target virtual address with target data of the system data;

storing, with a translation extension unit dedicated to the client and having a client address translation cache, a cached group of the address translations, wherein each address translation of the cached group includes one of the allocated virtual addresses and one of the physical addresses that is mapped to the one of the allocated virtual addresses; and when the target virtual address of the translation request is the same as the allocated virtual address of an identified address translation of the cached group, returning, with the translation extension unit, the one of the physical addresses that is mapped to the identified address translation to the client without transmitting the translation request to the memory management unit.

22. The method of claim 21, further comprising, when the target virtual address of the translation request is not the same as the allocated virtual address of any of the address translations of the cached group, transmitting the translation request to the memory management unit with the translation extension unit.

23. The method of claim 22, further comprising, when the target virtual address of the translation request is not the same as the allocated virtual address of any of the address translations of the cached group, returning the address translation of the plurality of address translations whose virtual address is the same as the target virtual address to the client with the memory management unit based on at least one of the translation lookaside buffer and the page table.

24. The method of claim 23, further comprising, when the memory management unit returns the address translation of the plurality of address translations whose virtual address is the same as the target virtual address to the client, adding the address translation to the cached group stored on the client address translation cache with the translation extension unit.

25. The method of claim 24, further comprising generating invalidation messages indicating one or more of the address translations are no longer valid with the memory management unit and updating values of one or more invalidation counters based on the invalidation messages with the translation extension unit.

26. The method of claim 25, further comprising, each time the translation extension unit adds an address translation to the cached group, recording and associating the values of the invalidation counters at that time with that address translation as associated values within the client address translation cache with the translation extension unit.

27. The method of claim 26, further comprising removing selected address translations of the cached group from the client address translation cache with the translation extension unit when the associated values of the selected address translation do not match current values of the invalidation counters.

28. The method of claim 27, further comprising determining whether the associated values of each of the address translations within the cached group do not match current values of the invalidation counters with the translation extension unit each time the translation extension unit adds a new address translation to the cached group.

29. The method of claim 28, wherein there are a plurality of invalidation counters and the values of each of the invalidation counters are updated based on a different type of the invalidation messages selected from the group consisting of: an address space identifier (ASID) invalidation message type, a virtual machine identifier (VMID) invalidation message type and a virtual address (VA) invalidation message type.

30. The method of claim 29, further comprising when any of the invalidation counters reach a maximum value, resetting all of the invalidation counters and removing all of the address translations of the cached group from the client address translation cache with the translation extension unit.

31. An address translation system, the system comprising:
means for storing system data at a plurality of physical addresses and a page table including a plurality of address translations that map a plurality of virtual addresses to the plurality of physical addresses;

means for processing coupled with the means for storing and including a memory management unit and a translation lookaside buffer storing a subset of the address translations of the page table;

means for generating a translation request, wherein the means for generating is allocated one or more allocated virtual addresses of the plurality of virtual addresses, the translation request including a target virtual address of the allocated virtual addresses, and the means for generating associates the target virtual address with target data of the system data; and means for translating having a client address translation cache storing a cached group of the address translations, wherein each address translation of the cached group includes one of the allocated virtual addresses and one of the physical addresses that is mapped to the one of the allocated virtual addresses;

wherein when the target virtual address of the translation request is the same as the allocated virtual address of an identified address translation of the cached group, the means for translating returns the one of the physical addresses that is mapped to the identified address translation to the means for generating without transmitting the translation request to the memory management unit.

* * * * *